United States Patent
Perrow et al.

[11] Patent Number: 6,074,303
[45] Date of Patent: Jun. 13, 2000

[54] CONSTANT VELOCITY UNIVERSAL JOINT

[75] Inventors: Scott Jay Perrow; Steven Mark Thomas, both of Saginaw, Mich.

[73] Assignee: General Motors Corporation, Detroit, Mich.

[21] Appl. No.: 09/205,309

[22] Filed: Dec. 4, 1998

[51] Int. Cl.$^7$ ........................................... F16D 3/26
[52] U.S. Cl. ..................... 464/111; 464/132; 464/905
[58] Field of Search ..................... 464/109, 111, 464/112, 113, 115, 118, 120, 121, 122, 123, 124, 127, 132, 905, 167

[56] References Cited

U.S. PATENT DOCUMENTS

| | | |
|---|---|---|
| 4,192,154 | 3/1980 | Nakamura et al. . |
| 4,472,156 | 9/1984 | Orain . |
| 4,512,750 | 4/1985 | Orain . |
| 4,643,698 | 2/1987 | Ehrlenspiel et al. ............... 464/111 |
| 4,684,356 | 8/1987 | Kimata et al. ..................... 464/111 |
| 4,689,035 | 8/1987 | Orain . |
| 4,971,595 | 11/1990 | Sasaki et al. . |
| 4,978,325 | 12/1990 | Mizukoshi ......................... 464/111 |
| 5,098,342 | 3/1992 | Mizukoshi . |
| 5,348,512 | 9/1994 | Hodge ............................... 464/111 |
| 5,376,050 | 12/1994 | Krude et al. . |
| 5,830,070 | 11/1998 | Krude ................................ 464/124 |

*Primary Examiner*—Terry Lee Melius
*Assistant Examiner*—Kenneth Thompson
*Attorney, Agent, or Firm*—Edmund P. Anderson

[57] ABSTRACT

A tripod universal joint including a cup-shaped outer joint member having three inward facing longitudinal roller channels with opposite planar side walls, an inner joint member inside of the outer joint member having three radial trunnions in the three roller channels, three spherical inner rollers supported on the radial trunnions for rotation and for radial linear translation, and three outer rollers between the planar side walls of the roller channels supported on corresponding ones of the inner rollers for relative rotation and for relative universal articulation. The outer rollers are prevented from tipping in the roller channels by a cylindrical cage between the inner and outer joint members. The cylindrical cage consists of three arc-shaped cage segments supported on the outer joint member for independent linear translation each having a window therein for a corresponding one of the outer rollers. The window in each cage segment is defined by a pair of longitudinal runners and a pair of lateral retainers. The runners slide against the runners of adjacent cage segments and cooperate to prevent the cage segments from tipping. The lateral retainers bear against opposite sides of the outer rollers to prevent the outer rollers from tipping.

3 Claims, 2 Drawing Sheets

CONSTANT VELOCITY UNIVERSAL JOINT

TECHNICAL FIELD

This invention relates to a tripod style constant velocity universal joint.

BACKGROUND OF THE INVENTION

A typical tripod style constant velocity universal joint ("tripod universal joint") includes a cup-shaped outer joint member having three longitudinal roller channels facing a longitudinal centerline of the outer joint member, an inner joint member inside of the outer joint member having three radial trunnions in the three roller channels, and a roller on each radial trunnion between a pair of side walls of the corresponding roller channel. When the inner joint member is articulated relative to the outer joint member, the rollers are tipped in their roller channels. When the inner joint member strokes linearly relative to the outer joint member while articulated, the rollers skid along the side walls of the roller channels with a resulting increase in friction and generated axial forces between the inner and the outer joint members. In the tripod universal joint described in United Kingdom Patent GB 2 225414 B, published Jul. 29, 1992, skidding of the rollers in the roller channels is minimized by guides which prevent the rollers from tipping. Each guide slides back and forth in a groove in the outer joint member and grips a corresponding one of the rollers on opposite sides thereof. To accommodate the resulting lost motion between the rollers and the radial trunnions, a spherical bearing is interposed between each trunnion and the corresponding one of the rollers thereon. The spherical bearing is commonly referred to as an inner roller and the roller thereon is commonly referred to as an outer roller. The outer rollers roll and articulate universally relative to the inner rollers to accommodate relative tipping and rotation between the outer rollers and the trunnions. The inner rollers slide in and out on the trunnions as the inner joint member tips back and forth in the outerjoint member. A tripod universal joint according to this invention is a novel alternative to the tripod universal joint described in the aforesaid UK Patent GB 2 225 414 B.

SUMMARY OF THE INVENTION

This invention is a new and improved tripod universal joint including a cup-shaped outer joint member having three inward facing longitudinal roller channels with opposite planar side walls, an inner joint member inside of the outer joint member having three radial trunnions in the three roller channels, a plurality of three spherical inner rollers supported on the radial trunnions for rotation and for radial linear translation, and a plurality of three outer rollers between the planar side walls of the roller channels supported on corresponding ones of the inner rollers for relative rotation and for relative universal articulation. The outer rollers are prevented from tipping in the roller channels by a cylindrical cage between the inner and outer joint members. The cylindrical cage consists of three arc-shaped cage segments supported on the outer joint member for independent linear translation each having a window therein for a corresponding one of the outer rollers. The window in each cage segment is defined by a pair of longitudinal runners and a pair of lateral retainers. The runners slide against the runners of adjacent ones of the cage segments and cooperate to prevent the cage segments from tipping. The lateral retainers bear against opposite sides of the outer rollers midway between the planar side walls of the roller channels to prevent the outer rollers from tipping in the roller channels.

DESCRIPTION OF THE PREFERRED EMBODIMENT

Figure 1:
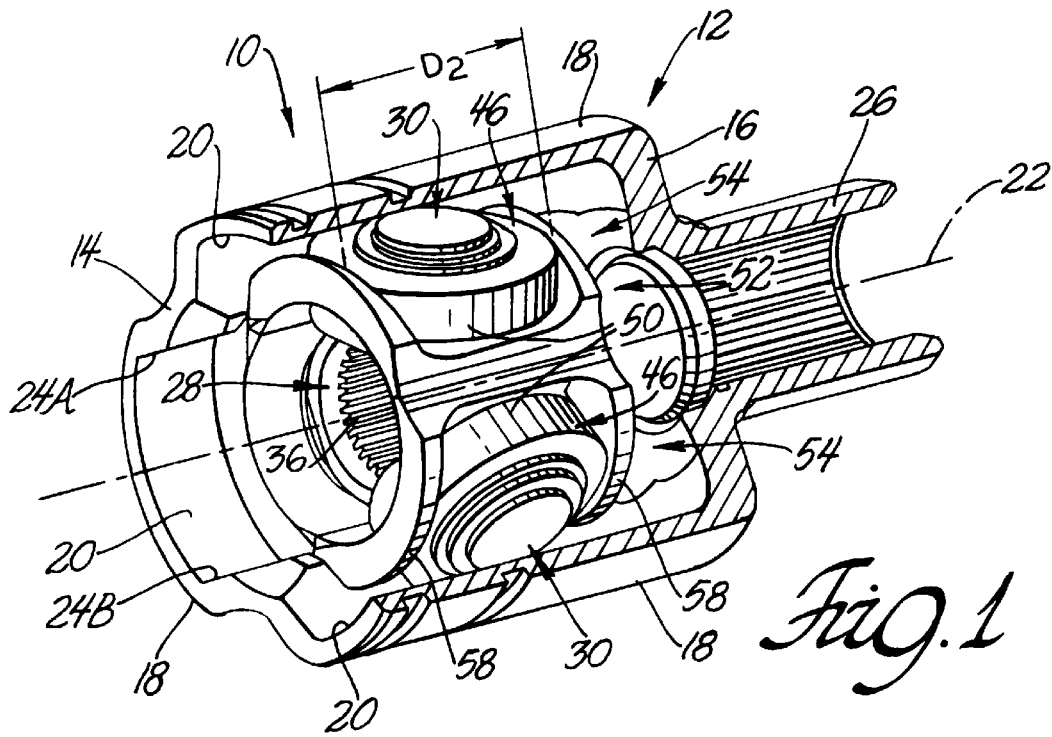
FIG. 1 is a broken-away perspective view of a tripod universal joint according to this invention.
Figure 3:
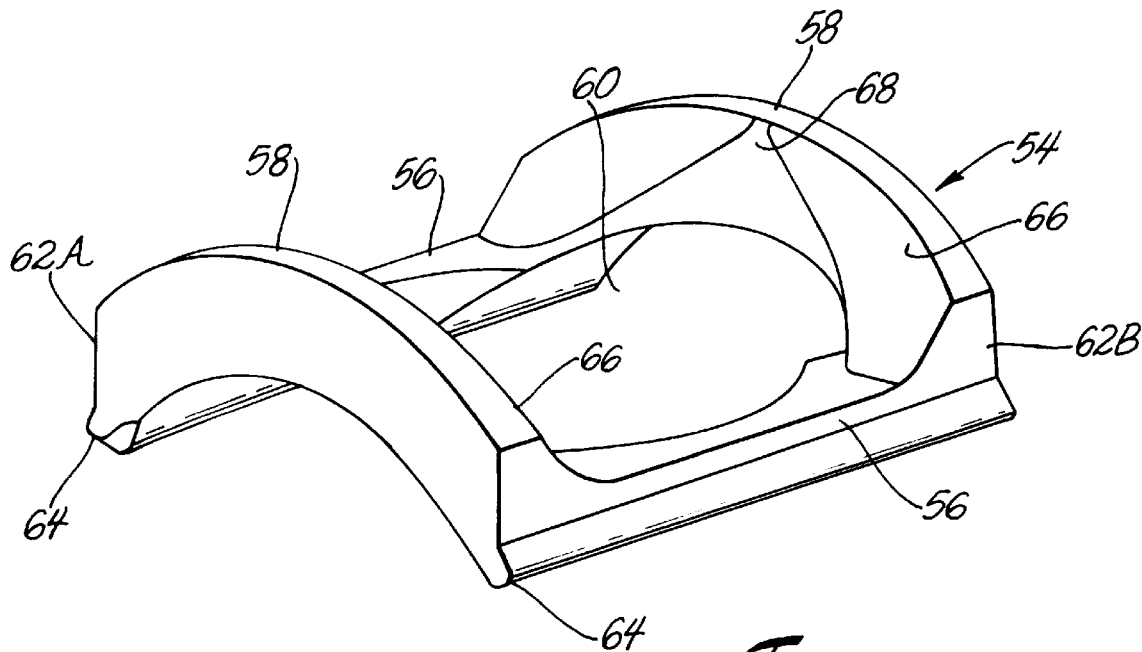
FIG. 3 is a perspective view of an arc-shaped cage segment of the tripod universal joint according to this invention.

Referring to FIGS. 1 and 3, a tripod universal joint 10 according to this invention includes an outer joint member 12 having a cup-shaped body defined by a cylindrical wall 14 and a circular bottom 16. The cylindrical wall 14 is interrupted by a plurality of three lobes 18 which define respective ones of a plurality of three longitudinal roller channels 20 facing inward toward a longitudinal centerline 22 of the outer joint member. Each of the roller channels 20 has a pair of laterally separated planar side walls 24A,24B parallel to the longitudinal centerline 22. A tubular stem 26 of the outer joint member integral with the bottom 16 has a plurality of internal splines through which the outer joint member is connected to a shaft, not shown, in the stem for unitary rotation about the longitudinal centerline 22.

An inner joint member or spider 28 of the tripod universal joint 10 is disposed inside of the cup-shaped body of the outer joint member 12 and includes a plurality of three integral radial trunnions 30 aligned on respective ones of a plurality of three uniformly spaced radial centerlines 32 of the inner joint member. Each of the radial trunnions 30 is disposed in a corresponding one of the roller channels 20 and has a cylindrical bearing race 34 which extends from a distal end of the trunnion to a platform at the base of the trunnion. The wall of a bore 36 in the inner joint member is interrupted by a plurality of internal splines through which the inner joint member is connected to a second shaft, not shown, for unitary rotation therewith and for unitary articulation therewith relative to the outer joint member 12.

The tripod universal joint 10 further includes a plurality of three inner rollers 38 each having a cylindrical bore 40 therein and a spherical outer surface 42. The cylindrical bore 40 of each of the inner rollers faces the cylindrical bearing race 34 on a corresponding one of the radial trunnions 30 and is separated therefrom by a plurality of needle roller bearings 44. The needle roller bearings 44 are captured between the platform of the corresponding radial trunnion and a retaining ring at the distal end thereof. The needle roller bearings support the inner rollers 38 on the radial trunnions 30 for rotation about the radial centerlines 32 and for linear translation in the direction of the radial centerlines.

A plurality of three outer rollers 46 of the tripod universal joint 10 are disposed between respective ones of the inner rollers 38 and the planar side walls 24A,24B of corresponding ones of the roller channels 20. Each of the outer rollers 46 has a spherical inner surface 48 journaled on the spherical outer surface 42 of the corresponding inner roller and cooperating therewith in coupling together the inner and outer rollers for relative rotation and for relative universal articulation. Each of the outer rollers 46 further includes a cylindrical outer surface 50 facing the planar side walls 24A,24B of the corresponding roller channel 20. The cylindrical outer surfaces 50 of the outer rollers bear against the planar side walls of the roller channels for torque transfer between the inner and outer joint members. The diameters of the cylindrical outer surfaces of the outer rollers are slightly smaller than a span dimension $D_1$, FIG. 2, between the planar side walls 24A,24B of the roller channels so that when the outer rollers roll against one of the planar side walls they do not at the same time skid against the opposite one of the planar side walls.

A cylindrical cage 52 of the tripod universal joint 10 is disposed between the inner and the outer joint members 28,12 and consists of a plurality of three identical arc-shaped cage segments 54. As best seen in FIG. 3, each of the cage segments includes a pair of runners 56 and a pair of lateral retainers 58 which cooperate in defining a window 60 for a corresponding one of the outer rollers 46. Each of the cage segments 54 has a pair of flat sides 62A, 62B relieved between the lateral retainers 58 which cooperate with planar side walls 24A,24B of the roller channels 20 in supporting the cage segments on the outer joint member in the roller channels for back and forth linear translation in the direction of the longitudinal centerline 22 of the outer joint member.

Each of the runners 56 on the cage segments terminates at a bearing edge 64 which extends the full length of the cage segment. The bearing edges 64 on opposite sides of each of the cage segments engage the bearing edges 64 on the adjacent ones of the cage segments and cooperate therewith in preventing the cage segments from tipping in the roller channels 20. At the same time, the flat sides 62A,62B of the cage segments cooperate with the planar side walls 24A,24B of the roller channels in preventing rotation of the cylindrical cage 52 about the longitudinal centerline 22 relative to the outer joint member.

Figure 2:
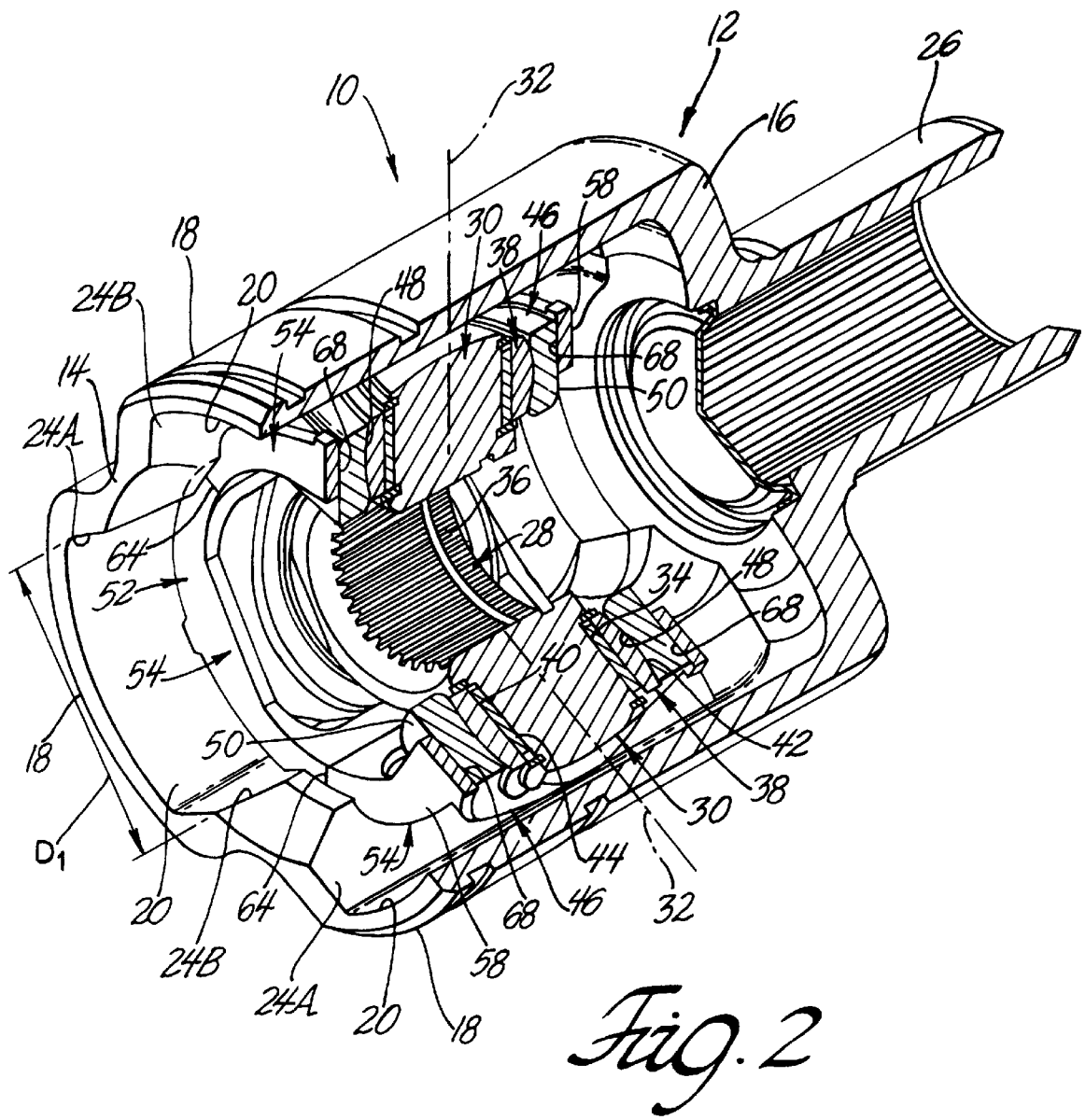
FIG. 2 is a further broken-away perspective view of the tripod universal joint according to this invention.

As seen best in FIGS. 2–3, the lateral retainers 58 of the cage segments 54 each have an inner surface 66 facing the window 60. Each of the inner surfaces 66 is relieved to avoid contact with the one of the outer rollers 46 in the window except midway between the flat sides 62A,62B of the cage segments at a pair of pad portions 68 of the inner surfaces. A second span dimension $D_2$ of the cage segments, FIG. 1, between the pad portions 68 corresponds closely to the diameters of the outer rollers 46 so that the pad portions define walls which bear against the outer rollers tangent to the cylindrical outer surfaces 50 thereof midway between the flat sides 62A,62B of the cage segments and, therefore, midway between the planar side walls 24A,24B of the roller channels.

When, for example, the tripod universal joint 10 is incorporated in a front wheel drive system, not shown, of a motor vehicle, the inner and outer joint members may vibrate linearly relative to each other in the direction of the longitudinal centerline 22 of the outer joint member when the motor vehicle is stopped. If, in that circumstance, the inner joint member is also articulated relative to the outer joint member, it is important to minimize skidding of the outer rollers 46 in the roller channels 20 in order to minimize the generated axial forces between the inner and outer joint members.

To that end, the pad portions 68 on the lateral retainers 58 on the cage segments 54 bear against the outer surfaces 50 of the outer rollers 46. Force reactions urging tipping of the outer rollers in the roller channels are reacted to the cage segments 54 through the lateral retainers 58 and resisted at the sliding interfaces between the bearing edges 64 of the runners 56 which cooperate in preventing the cage segments from tipping. With tipping of the outer rollers thus prevented, the outer rollers roll on the planar side walls 24A,24B of the roller channels 20 regardless of the articulation angle of the inner joint member 28 and thus avoid friction attributable to skidding on the planar side walls of the roller channels. The lengths of the cage segments 54 in the direction of the longitudinal centerline 22 of the outer joint member is calculated to maintain an overlap between the bearing edges 64 of at least 50% of the lengths thereof for maximum stability. As the inner joint member 28 vibrates linearly relative to the outer joint member in the direction of the longitudinal centerline 22 thereof, the outer rollers 46 induce corresponding linear vibration of the cage segments 54 which slide relative to each other at the bearing edges 64 of their runners 56.

Having thus described the invention, what is claimed is:

1. A tripod universal joint including
   an outer joint member having a plurality of three roller channels each having a pair of planar side walls parallel to a longitudinal centerline of said outer joint member,
   an inner joint member inside of said outer joint member having a plurality of three radial trunnions protruding into respective ones of said plurality of three roller channels,
   a plurality of three inner rollers supported on respective ones of said plurality of three radial trunnions for rotation about and for radial linear translation along said respective ones of said plurality of three radial trunnions,
   a plurality of three outer rollers supported on respective ones of said plurality of three inner rollers for relative rotation and for relative universal articulation each including a cylindrical outer surface between said pair of planar side walls of the corresponding one of said roller channels, and
   a guide means operative to prevent each of said plurality of three outer rollers from tipping,
   characterized in that said guide means comprises:
      a cylindrical cage between said inner and said outer joint members consisting of a plurality of three arc-shaped cage segments each having a window therein for one of said plurality of three outer rollers,
      a support means operative to support each of said cage segments on said outer joint member for independent back and forth linear translation in the direction of said longitudinal centerline of said outer joint member,
      a pair of bearing edges on opposite sides of each of said plurality of three cage segments parallel to said longitudinal centerline of said outer joint member each in sliding engagement with a bearing edge on a side of an adjacent one of said plurality of three cage segments and cooperating therewith in preventing each of said plurality of three cage segments from tipping, and
      a wall means on each of said plurality of three cage segments operative to tangentially engage said outer cylindrical surface of the one of said plurality of three outer rollers in said window thereof on opposite sides of the one of said plurality of three outer rollers and midway between said planar side walls of the corresponding one of said plurality of three roller channels to prevent the one of said plurality of three outer rollers from tipping.

2. A tripod universal joint including
   an outer joint member having a plurality of three roller channels each having a pair of planar side walls parallel to a longitudinal centerline of said outer joint member,
   an inner joint member inside of said outer joint member having a plurality of three radial trunnions protruding into respective ones of said plurality of three roller channels, a plurality of three inner rollers supported on respective ones of said plurality of three radial trunnions for rotation about and for radial linear translation along the respective ones of said plurality of three radial trunnions, a plurality of three outer rollers supported on respective ones of said inner rollers for relative rotation and for relative universal articulation each including a cylindrical outer surface between said pair of planar side walls of the corresponding one of said roller channels, and a guide means operative to prevent each of said plurality of three outer rollers from tipping, characterized in that said guide means comprises:
  a cylindrical cage between said inner and said outer joint members consisting of a plurality of three arc-shaped cage segments each having a window therein for one of said plurality of three outer rollers defined between a pair of runners parallel to said longitudinal centerline of said outer joint member and a pair of lateral retainers perpendicular to said pair of runners
  a support means operative to support each of said cage segments on said outer joint member for independent back and forth linear translation in the direction of said longitudinal centerline of said outer joint member,
  a bearing edge on each of said pair of runners on each of said plurality of three cage segments in sliding engagement with a bearing edge on a runner on an adjacent one of said cage segments and cooperating therewith in preventing each of said plurality of three cage segments from tipping, and
  a pad portion on each of said lateral retainers tangentially engaging said outer cylindrical surface of the one of said plurality of three outer rollers therebetween on opposite sides thereof midway between said planar side walls of the corresponding one of said roller channels to prevent the one of said plurality of three outer rollers from tipping.

3. The tripod universal joint recited in claim 2 wherein said support means comprises:
  a pair of planar sides on each of said cage segments sliding against respective ones of said pair of planar side walls of the corresponding one of said plurality of three roller channels.

\* \* \* \* \*